(12) United States Patent
Ide et al.

(10) Patent No.: US 6,218,045 B1
(45) Date of Patent: *Apr. 17, 2001

(54) SEALED LEAD-ACID STORAGE BATTERY

(75) Inventors: Masayuki Ide; Takehiro Sasaki; Takurou Nakayama; Toshihiro Inoue, all of Toyohashi (JP)

(73) Assignee: Matsushita Electric Industrial Co., Ltd., Osaka-Fu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/185,064

(22) Filed: Nov. 3, 1998

(30) Foreign Application Priority Data

Nov. 7, 1997 (JP) .................................... 9-305427
May 28, 1998 (JP) .................................... 10-147124

(51) Int. Cl.$^7$ .................................................. H01M 2/04
(52) U.S. Cl. ........................... 429/176; 429/175; 429/57; 429/185
(58) Field of Search .................... 429/176, 175, 429/177, 185, 163, 57

(56) References Cited

U.S. PATENT DOCUMENTS

| | | | |
|---|---|---|---|
| 4,227,140 | * 10/1980 | Nardella et al. | 320/2 |
| 5,227,266 | 7/1993 | Shaffer et al. | 429/160 |
| 5,478,878 | * 12/1995 | Nagaoka et al. | 524/430 |
| 5,554,455 | 9/1996 | Inoue et al. | 429/53 |
| 5,780,180 | * 7/1998 | Okamoto et al. | 429/175 |
| 5,985,480 | * 11/1999 | Sato et al. | 429/65 |
| 6,040,081 | * 3/2000 | Van Lerberghe | 429/131 |

FOREIGN PATENT DOCUMENTS

| | | |
|---|---|---|
| 0 566 377 A1 | 10/1993 | (EP) . |
| 0 692 838 A1 | 1/1996 | (EP) . |
| 0 771 036 A1 | 5/1997 | (EP) . |
| 0 835 908 A1 | 4/1998 | (EP) . |
| 0 874 408 A1 | 10/1998 | (EP) . |
| 6-127656 | 8/1985 | (JP) . |
| 60-127656 | 8/1985 | (JP) . |
| 62-071165 | 4/1987 | (JP) . |
| 62-071166 | 4/1987 | (JP) . |
| 06203814 | 7/1994 | (JP) . |
| 6-203814 | 7/1994 | (JP) . |
| 6-77152 | 10/1994 | (JP) . |
| 10-139998 | 5/1998 | (JP) . |
| 10-208705 | 8/1998 | (JP) . |

\* cited by examiner

*Primary Examiner*—Stephen Kalafut
*Assistant Examiner*—R Alejandro
(74) *Attorney, Agent, or Firm*—Akin, Gump, Strauss, Hauer & Feldt, L.L.P.

(57) ABSTRACT

A sealed lead-acid storage battery having a long trickle life, being excellent in the welded strength between the container cover and the top lid covering the part of the container cover where a vent valve is provided, and having a high reliability is disclosed. The battery comprises: a container for accommodating an electrode group, a container cover for closing an open end of the container by being bonded to the open end of the container with a resin adhesive, and a top lid for covering a part of the container cover where a vent valve is provided by being bonded to the container cover by means of ultrasonic welding, wherein the container is formed with a denatured polyphenylene ether resin containing a flaky inorganic substance of humidity non-transmitting property, whereas the container cover and the top lid are formed with acrylonitrile-butadiene-styrene resin containing no flaky inorganic substance of the humidity non-transmitting property.

7 Claims, 5 Drawing Sheets

SEALED LEAD-ACID STORAGE BATTERY

BACKGROUND OF THE INVENTION

With the rapid progress of the society towards the information and intelligence-oriented one in the recent years, uninterruptible power supplies are being widely used as power sources for backing-up computers which are key components of such society. The conditions, such as rated voltage, temperature, humidity and the like, under which the uninterruptible power supplies are operating extend over a wide range. Thus, the life of the sealed lead-acid storage batteries included in the uninterruptible power supplies depends heavily upon the service conditions. In general, the sealed lead-acid storage batteries installed in the uninterruptible power supplies are frequently used under a constantly charging state, i.e., so-called trickle charge condition. In a case of being used under the trickle charge conditions of a high temperature and a low humidity in particular, it is confirmed that the trickle life mode of the batteries is an early increase in the internal resistance of the batteries due to the decrease in the amount of the electrolyte.

In particular, since the uninterruptible power supplies usually have heat sources inside thereof and are usually installed indoor, the deteriorating mode of the batteries depends heavily upon the decrease in the amount of the electrolyte and thus the trickle life of the batteries sometime terminates early.

The material for the container and the container cover of the conventional sealed lead-acid storage batteries starts from the use of glass but at present tends towards those of resins in most cases. The containers made of a resin are indispensable for the recent trend in designing the batteries to have a smaller size and a lighter weight. However, in the case of using the resin container, the decrease in the water content cannot be avoided.

Attempts have been made in order to suppress the escape of water from the resin container in such manners of adding mica which is a substance free from the humidity transmitting property to acrylonitrile-butadiene-styrene resin (hereinafter referred to as ABS resin) which has frequently been used for the containers and the container covers of the batteries (Japanese Unexamined Patent Publication Sho 62-71166), of adding glass flakes (Japanese Unexamined Utility Model Publication Hei 6-71152), and of adding glass flakes to polyphenylene ether resins (Japanese Unexamined Patent Publication Hei 6-203814).

The most significant problem which must be solved in a sealed lead-acid storage battery which does not permit any replenishment or supplementation of water from outside of the container is to reduce to a minimum an escape of water from the inside of the container. As stated above, introduction of an additive for impairing the permeation of water from the resin advantageously increases the mechanical strength of the resin, but causes a problem that the anti-impact strength of the resin is decreased dramatically. Under the growing trend of designing the batteries to have a smaller size and a lighter weight, the decrease in the impact strength is a fatal problem in such a case of sudden drop of the batteries or the like accident.

In the sealed lead-acid storage batteries in general, container covers have ports for injecting the electrolyte and top lids which are welded to the container covers for covering vent valves provided on the ports, by means of ultrasonic welding. However, in such a case of changing the resin material for the container covers or the top lids therefor, or of adding additives thereto, the conditions for the ultrasonic welding between the resin components are also changed and there has been a tendency of seriously decreasing the welded strength.

The sealed lead-acid storage batteries for the computer backing-up application are required to be constantly in charged states. For that reason, the trickle charge is constantly performed for replenishing the lost charge due to the self-discharge by an outside power source. When the sealed lead-acid storage batteries are charged, oxygen is constantly generated from the positive electrodes inside the containers. Although most of the oxygen is safely absorbed by the negative electrode, the internal pressure inside the container is still larger than the atmospheric pressure in most cases, especially in a high temperature atmosphere such as 40° C. or over, and during the trickle charge, a pressure is exerted on the vent valves in the direction of opening them.

For that reason, a stress is exerted on the top lids in the direction for stripping their parts welded to the container covers from the covers, and thus there is a need for securing a satisfactory welded strength between the top lids and the container covers. When the top lids are stripped-off from the container covers, sealing property of the vent valves is damaged, the electrolyte decreases abruptly, the negative electrode plates are deactivated by being reacted with the oxygen in the air, and the capacity of the batteries decreases abruptly.

In general, the sealed lead-acid storage batteries used in the computer backing-up application are so configured as to output a high voltage by serially connecting a plurality of monoblock batteries into assembled batteries. In such application, if only one stripping-off occurs at the welded part between the container cover and the top lid in one monoblock battery constituting the assembled batteries, besides the rapid deterioration of the performance of the one monoblock battery, the assembled batteries as a whole suffer from the capacity decrease.

In addition, the monoblock batteries whose gas-tight property has once been deteriorated in this manner abruptly increase their internal resistance, thereby to remarkably decrease the charge acceptance of the assembled batteries as a whole. In a case of still continuing the use of the assembled batteries under such a circumstance, the normal monoblock batteries whose gas-tight property has not been deteriorated also fall into a charge-deficient state. Once such circumstance is brought, there is a concern that any restoration cannot be expected by replacing only the defective monoblock batteries whose gas-tight property has been deteriorated with normal ones.

BRIEF SUMMARY OF THE INVENTION

The present invention intends to solve the above-mentioned problems by minimizing the decrease in the impact strength of the resin for the container, and lessening the escape of the water from the inside of the battery, even if the battery is used under the condition of a high temperature and a low humidity, thereby to suppress the increase in the internal resistance of the battery. The primary object of the present invention is to provide a sealed lead-acid storage battery having a long trickle life.

Another object of the present invention is to provide a sealed lead-acid storage battery with improved reliability by effecting a tight connection between a container cover and a top lid for covering a portion of the container cover where a vent valve is provided, using ultrasonic welding.

The present invention provides a sealed lead-acid storage battery which comprises a container for accommodating an electrode group, a container cover for closing an open end of the container and a top lid for covering a part of the container cover where a vent valve is provided, wherein the container is configured with a denatured polyphenylene ether resin containing a flaky inorganic substance of humidity non-transmitting property.

The present invention also provide a sealed lead-acid storage battery comprising a container for accommodating an electrode group, a container cover for closing an open end of the container by being bonded to the open end of the container with a resin adhesive, and a top lid for covering a part of the container cover where a vent valve is provided by being bonded to the container cover by means of ultrasonic welding, wherein the container is configured with a denatured polyphenylene ether resin containing a flaky inorganic substance of humidity non-transmitting property, and the container cover and the top lid are configured with acrylonitrile-butadiene-styrene resin containing no flaky inorganic substance of humidity non-transmitting property.

In the above-mentioned sealed lead-acid storage battery, the flaky inorganic substance of humidity non-transmitting property is preferably mica or talc $\{Mg_3(Si_4O_{10})(OH)_2\}$.

In addition, as the resin material for the above-mentioned container, a polymer alloy of a polyphenylene ether resin and a polystyrene resin is preferable. In particular, a polymer alloy comprising the polyphenylene ether resin at 30 to 80 wt % and the polystyrene resin at 70 to 20 wt % is preferred.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The sealed lead-acid storage battery in accordance with the present invention comprises, as described above, a container for accommodating an electrode group which is made of a denatured polyphenylene ether resin containing a flaky inorganic substance of humidity non-transmitting property. The polyphenylene ether resin (hereinafter referred to as PPE resin) is a general term for the polymer represented by the following general formula, and may be single one of the polymers represented by the general formula, or may alternatively be another one configured by combining a plurality of the polymers.

wherein $R^1$, $R^2$, $R^3$ and $R^4$ are independently a hydrogen atom, a halogen atom, or a monohydric substituent group selected from the group consisting of an alkyl group, an alkoxy group, a haloalkyl group containing at least two carbon atoms between a halogen atom and a phenyl ring, and a haloalkoxy group containing no tertiary α-carbon atom, and n is an integer representing the degree of polymerization.

In a preferred example, $R^1$ and $R^2$ are an alkyl group containing 1 to 4 carbon atoms, $R^3$ and $R^4$ are a hydrogen or an alkyl group containing 1 to 4 carbon atoms. Specifically, there can be exemplified as poly(2,6-dimethyl-1,4-phenylene)ether, poly(2,6-diethyl-1,4 -phenylene)ether, poly(2-methyl-6-diethyl-1,4-phenylene)ether, poly(2-methyl-6-propyl-1,4-phenylene)ether, poly(2,6-dipropyl-1,4-phenylene)ether, poly(2-ethyl-6-propyl-1,4-phenylene) ether, and the like. A particularly preferred polyphenylene ether resin is poly(2,6-dimethyl-1,4-phenylene)ether.

As the copolymer of the polyphenylene ether, there can be exemplified a copolymer partly containing a triply alkyl-substituted phenol, for instance, 2, 3, 6-trimethyl phenol in the above-mentioned polyphenylene ether repetition unit.

As the polystyrene resins, polymers of styrene or its derivative, for instance, vinyl toluene, ethylvinyl toluene, α-methylstyrene, and their mixtures are used. Those polymers which are denatured with natural or synthetic elastomer such as butyl rubber, ethylene-propylene copolymer, natural rubber or the like are also used.

Preferable denatured PPE resins for the container are polymer alloys of the above-mentioned PPE resin and the above-mentioned polystyrene resin and comprising 30 to 95 wt % of PPE resin and 70 to 5 wt % of styrene resin. Although the PPE resin is excellent in mechanical strength, heat-resistant property and electrical property, and has an extremely small water-absorbing property, it is inferior in moldability, and thus the alloy needs at least 5 wt % of styrene resin.

More preferable polymer alloy comprises 30 to 80 wt % of the PPE resin and 70 to 20 wt % of the styrene resin. This polymer alloy has an identical anti-impact strength to that of the representative conventional container material ABS resin and has better moldability.

As the flaky inorganic substance of non-humidity transmitting property to be added to the above-mentioned resin material, talc or mica which is one species of rock-forming silicate mine is preferably used. Mica has an advantage that it can readily be cut into flakes due to its own cleaving property. The content of these flaky inorganic substances in the above-mentioned resin material is preferably from 5 wt % to 15 wt %, and a range between 8 wt % and 15 wt % is particularly preferable.

Since shapes of mica and talc are like flakes, when the resin material including mica or talc is injected into a molding die to mold the material into the container, the flakes of the mica or the talc orient along the direction of the flow of the resin material. Therefore, in the molded container, the flakes of the mica or the talc preferentially align in parallel to the wall of the container. By this means, it is possible to lessen the escape of water transmitting through the container.

According to the present invention, it is therefore possible to lessen the escape of water from the inside of the battery by transmitting through the container, even if the battery is used under the conditions of a high temperature and a low humidity, thereby to give a sealed lead-acid storage battery whose increase in the internal resistance is suppressed and whose trickle life is improved.

Figure 1:
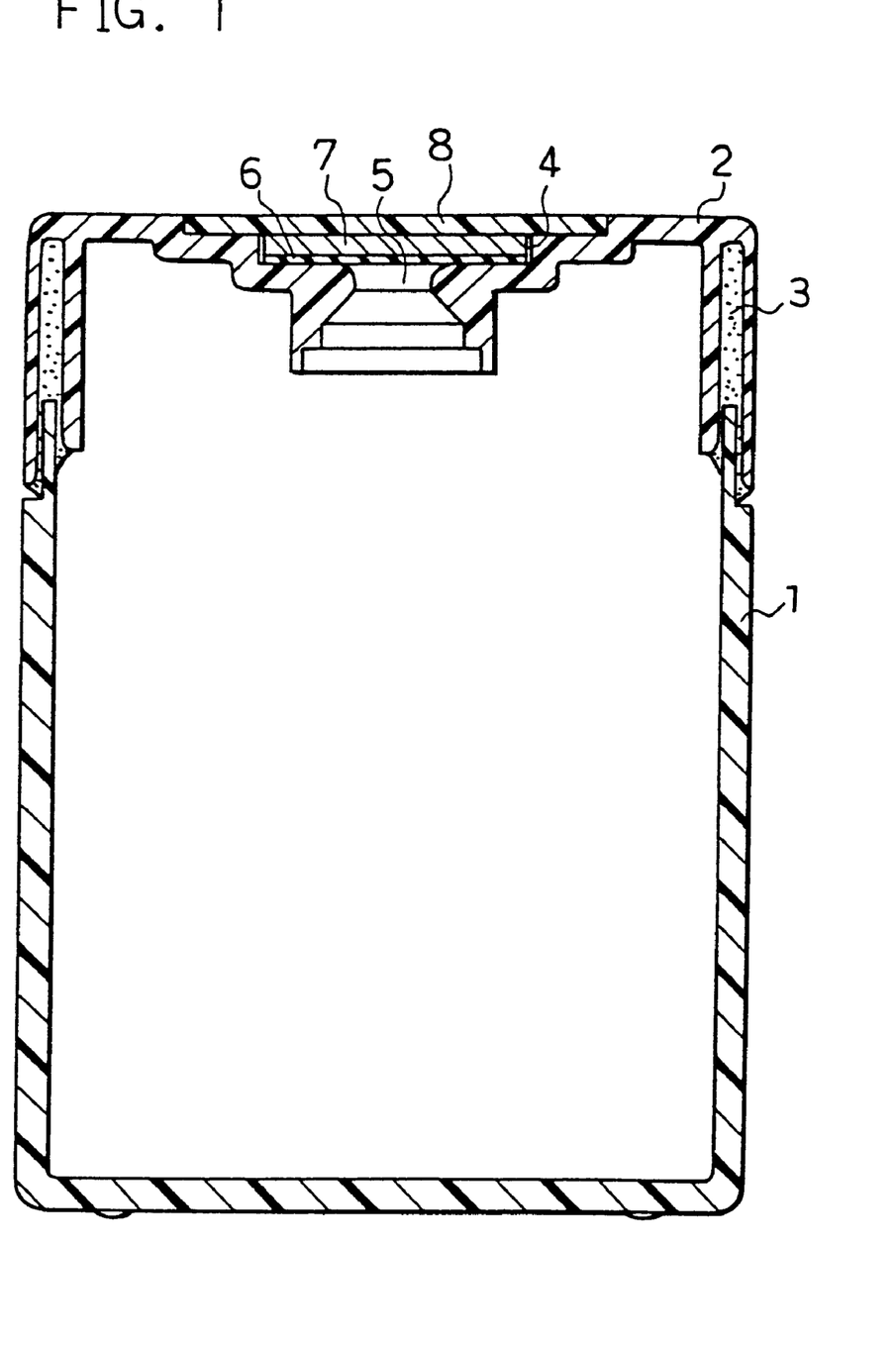
FIG. 1 is a longitudinal cross-sectional view showing the container and the container cover of the sealed lead-acid storage battery in accordance with an embodiment of the present invention.

FIG. 1 shows an outline of the configuration of the container and the container cover used in the sealed lead-acid storage battery in accordance with the present invention. Details of the essential part thereof are shown by the enlarged views in FIGS. 2 and 3.

Figure 2:
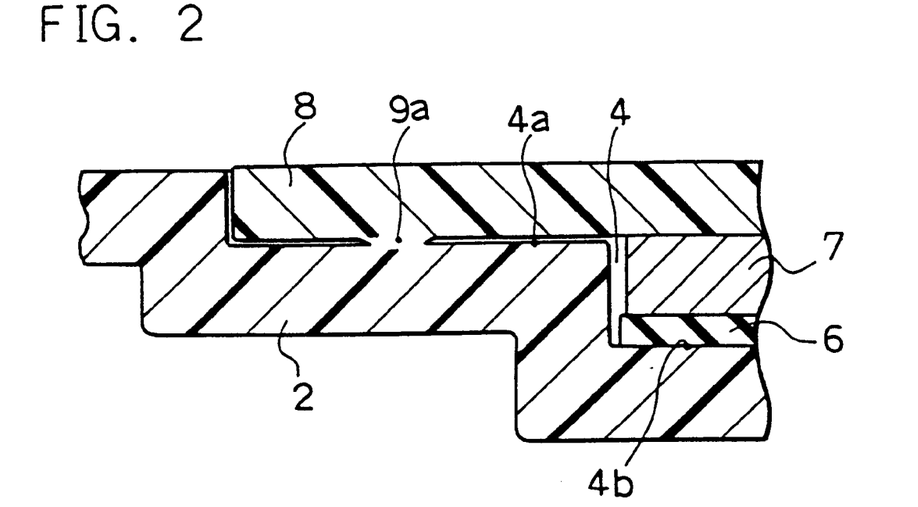
FIG. 2 is a longitudinal cross-sectional view showing the essential part of the shown container cover.
Figure 3:
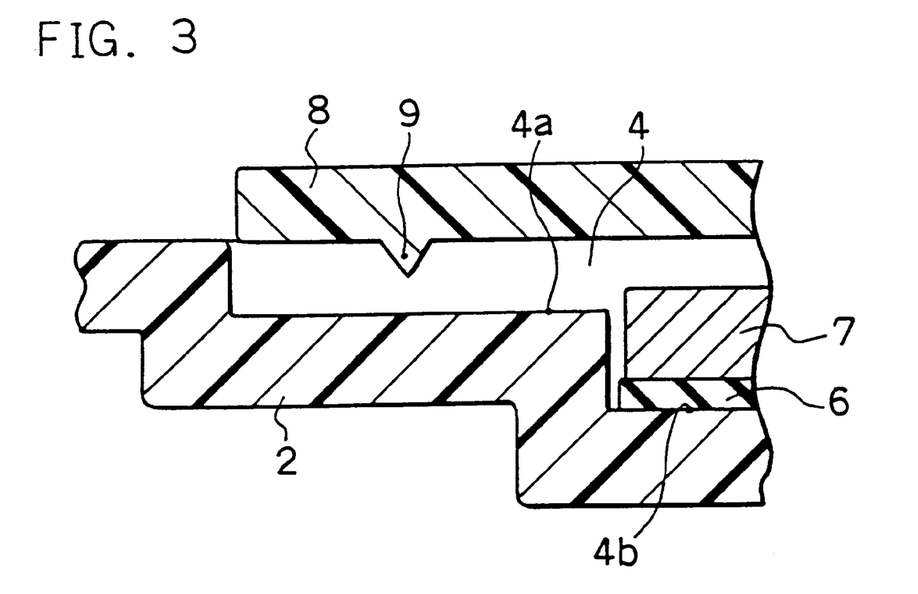
FIG. 3 is a longitudinal cross-sectional view showing the essential part shown by FIG. 2 before welding the top lid.

Numeral 1 designates a container whose top end is open. After accommodating an electrode group (not shown) in this container 1, it is closed with the container cover 2. The container cover 2 has, on its bottom end edge, a recess for receiving an open end edge of the container 1. By fixing the container cover 2 upside down, and filling an epoxy resin adhesive in the above-mentioned recess, the open end edge of the container 1 in an upside down position is fit into the recess, and the adhesive is cured by heating. In this manner, the container cover 2 is securely bonded to the container 1. The container cover 2 also has a stepped recess 4, and an inlet port 5 is provided on the center of the bottom part 4b of the stepped recess 4. On the bottom part 4b of the stepped recess 4, a sheet rubber valve 6 and a valve retaining mat 7 are inserted, and on a step 4a of the stepped recess 4, a top lid 8 is fixed by means of ultrasonic welding. The rubber valve 6 is made of, for instance, neoprene rubber. The valve retaining mat 7 is made of a sponge of a ternary polymer compound of ethylene-propylene-diene.

The top lid 8 has projections 9 on spots at which it is intended to be welded to the container cover 2. Each of the projections 9 has a size of, for instance, a length: 5 mm and a width at its root: 1 mm, and extends in the direction perpendicular to the sheet of FIG. 3. The described projections are provided on four sides of the top lid 8, along the respective sides with intervals of 5 mm. The projections 9 melt by the vibrating energy of the ultrasonic wave, thereby to be welded to the step 4a of the container cover 2. Numeral 9a designates the welded spot. Gaps for allowing the gas to escape are formed between the container cover 2 and the top lid 8 at spots other than the above-mentioned welded spots.

The top lid 8 fixed on the step 4a of the recess 4 presses the valve retaining mat 7, thereby to press the rubber valve 6 onto the bottom part 4b with the resiliency of the mat 7. At the part of the rubber valve 6 being in contact with the bottom part 4b of container cover 2, silicone oil is applied. Therefore, although the inlet port 5 is normally sealed with the rubber valve 6, when the internal pressure inside the battery exceeds a predetermined value by an abnormal gas generation or the like, the gas escapes through the gaps between the rubber valve 6 and the bottom 4b of the recess 4, and the gaps between the container cover and the top lid by overcoming the resiliency of the valve retaining mat 7 to the outside of the battery.

Figure 4:
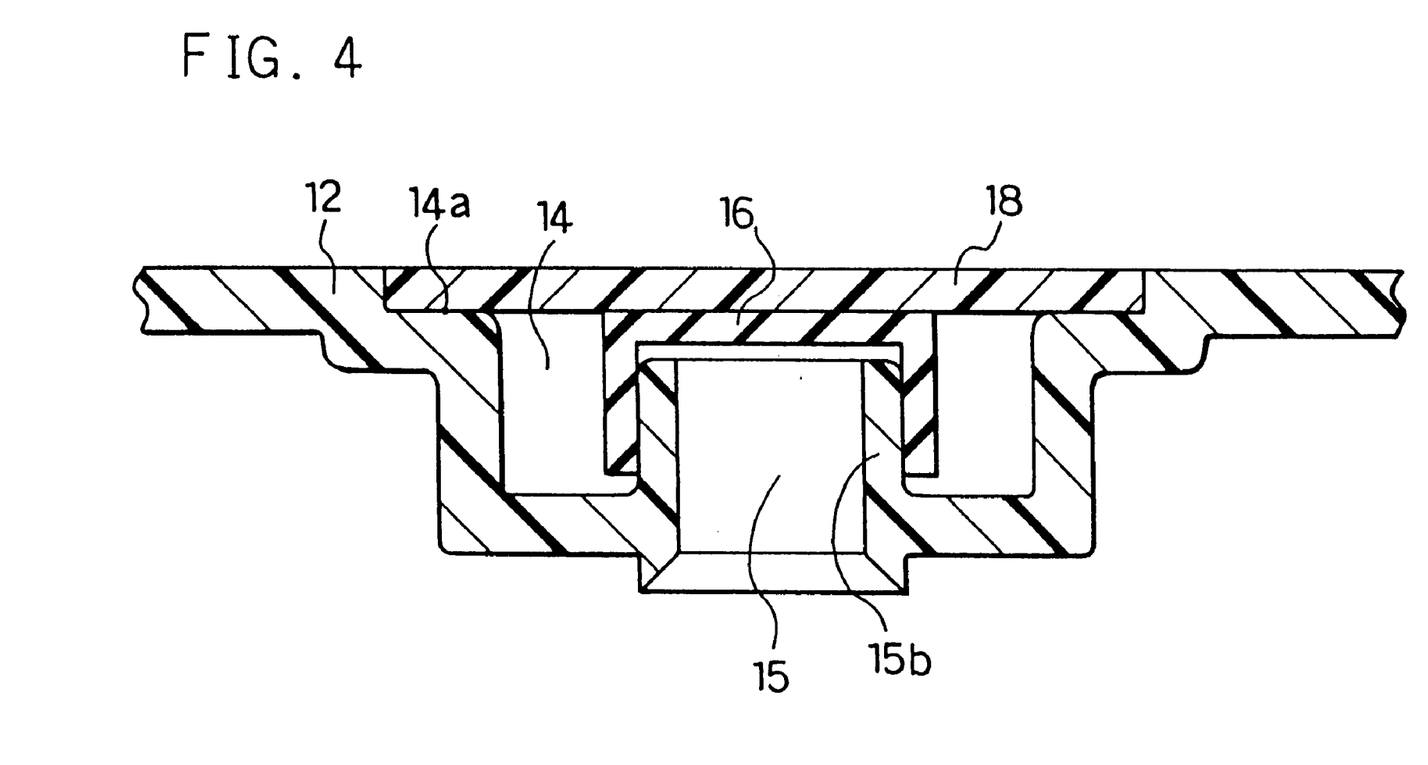
FIG. 4 is a longitudinal cross-sectional view showing the essential part of the container cover in accordance with another embodiment.

The structure of the vent valve provided on the container cover should not be limited to that shown by FIG. 1, but a vent valve of structure shown, for instance, by FIG. 4 may also be used. A container cover 12 shown by FIG. 4 has a cylindrical part 15b which surrounds the inlet port 15 and a cap-shaped rubber valve 16 covering the top end of the cylindrical part 15b. In this example, a top lid 18 is welded on the step 14a of the recess 14 by means of ultrasonic welding and mildly presses the valve 16. When the gas pressure inside the battery abnormally rises, the raised pressure pushes the rubber valve outward, thereby opening a gas-releasing path between the rubber valve and the cylindrical part, and the gas escapes through this gas-releasing path to the outside of the valve, and then through the gaps between the container cover and the top lid to the outside of the battery.

As described above, the top lid is fixed on the container cover by being partly welded to the container cover so that it provides gaps for escaping the gas at an actuation of the vent valve. Therefore, the welded parts between the top lid and the container cover should have a sufficient strength. If the strength of the welded parts is insufficient and the top lid is ripped off from the container cover, the gas-tight property of the vent valve is deteriorated.

Although the vent valve is provided for every cells, the top lid may be formed into a size sufficient for covering the vent valves of two or more cells. In the embodiment which will be described later, a single top lid having a length of 128 mm, a width of 33 mm and a thickness of 1.5 mm and a projection of the above-mentioned size is used for the battery composed of 6 cells.

In the sealed lead-acid storage battery having the above-mentioned configuration, the present invention uses, as the material for the container, the denatured PPE resin which contains the flaky inorganic substance such as mica, talc or the like, and the ABS resin which does not include the above-mentioned flaky inorganic substance as the material for the container cover for closing the open end of the container and for the top lid for covering the part of the container cover where the vent valve is provided, wherein the top lid is bonded to the container cover by means of ultrasonic welding.

If the flaky substance having a large surface area such as talc or mica is included in the resin material for the container cover and the top lid, the vibration energy during the ultrasonic welding cannot effectively be converted into thermal energy and so appropriate condition for the intended welding can not be obtained. The reason for this is believed to be a loss in the vibration energy due to the conversion of the vibration energy into the thermal energy effected at junction of the resin with the mica or talc. The phenomenon is particularly remarkable in such flaky substance having a large surface area per its volume or weight as talc or mica.

In the following paragraphs, specific examples of the present invention will be described.

EXAMPLE 1

A sealed lead-acid storage battery having a voltage of 12 V and a discharge capacity of 7.2 Ah at 20 hour rate was used. The battery has a length of 151 mm, a width of 64.5 mm and a height of 94 mm.

By injection-molding a resin material prepared by adding scaly flakes of talc which is a magnesium-containing silicate mine to a polymer alloy (ratio by weight: 40:60) of the PPE resin, poly(2,6-dimethyl-1,4-phenylene)ether and polystyrene at a ratio of 10 wt %, a container having a wall thickness of 2.3 mm was produced. A container cover and a top lid were both molded with ABS resin. The talc used here was approximately disk-shaped and typically had a thickness of 0.5 μm and a diameter of 2.5 μm.

The container was bonded to the container cover with an epoxy resin adhesive, and the top lid was joined to the container cover by means of ultrasonic welding. The ultrasonic welding is based on the principle that by generating a strong abrasion heat at a junction between surfaces of two components, i.,e., in this example, the container cover and the top lid, the vibration energy of the ultrasonic wave is converted into the thermal energy, and the resins are molten and welded together by the generated heat.

Condition employed in this ultrasonic welding was the same as that usually used in the case of welding the components of ABS resin, i.e., pressure: 1.0–1.5 kg/cm² and welding time: 0.3 second.

The sealed lead-acid storage battery produced in accordance with this example is named Battery "a".

Comparative Examples

Battery "b" was produced by configuring all of the container, the container cover and the top lid with the material which is the same as that used for the container of Battery "a" of Example 1, i.e., the polymer alloy of the polyphenylene ether resin and the styrene resin containing the talc at 10 wt %, while Battery "c" was produced by configuring all of the container, the container cover and the top lid with the same polymer alloy free from the talc.

Battery "d" was produced by configuring all of the container, the container cover and the top lid with the material of ABS resin containing the talc at 10 wt %, while Battery "e" was produced with the container of the same material as mentioned above but by configuring the container cover and the top lid with the material of ABS resin containing no talc. Further, Battery "f" was produced by configuring all of the container, the container cover and the top lid with the material of ABS resin containing no talc.

In Comparative examples, the container covers were bonded to the top lids respectively by means of ultrasonic welding under the same condition as that in Example 1.

Each of the batteries thus produced was tested to evaluate the welded strength by pulling the top lid with a force of 10 kgw so as to separate it from the container cover; no separation of the top lid from the container cover was defined as acceptable welding and separation of the top lid from the container cover as poor welding. The results for the batteries "a" to "f" (50 pieces for each) are shown in Table 1.

TABLE 1

| Battery | Ratio of unacceptable welding |
| --- | --- |
| a | 0% |
| b | 100% |
| c | 15% |
| d | 75% |
| e | 0% |
| f | 0% |

As clearly shown in Table 1, it is appreciated that the top lids are bonded to the container covers with a satisfactory strength in Battery "a" of Example 1 and in Batteries "e" and "f" of Comparative examples whose container covers and top lids are formed with the ABS resin containing no talc. In Battery "b", the container cover is hardly bonded to the top lid formed with the above-mentioned polymer alloy containing talc at 10 wt %. As a result of the tests conducted by changing the welding condition, it is hard to find out an appropriate welding condition for the above-mentioned polymer alloy containing talc.

In Battery "c" configured by using the above-mentioned polymer alloy containing no talc for the container cover and the top lid, the welding of the top lid to the container cover is found to be possible by limiting the condition to a very narrow range. However, since the welding requires a higher ultrasonic wave output than that required for the ABS resin, the use of the polymer alloy is apparently disadvantageous as compared with the case of using the ABS resin from the viewpoint of manufacturing. In a case of the ABS resin, it is also difficult to weld the components with a satisfactory strength if the resin contains talc.

Next, trickle life tests were conducted on the above-mentioned Batteries "a", "b", "c" and "f" in an atmosphere of 60° C. The conditions for the tests were that of continuous charge at a constant voltage of 13.80±0.1 V, while checking the discharge capacity for every 3 weeks. The trickle life was determined by the discharge capacity which reached under 50% of the initial discharge capacity in a discharge at a current of 3.0 CA until the terminal voltage dropped to 9.6 V.

Figure 5:
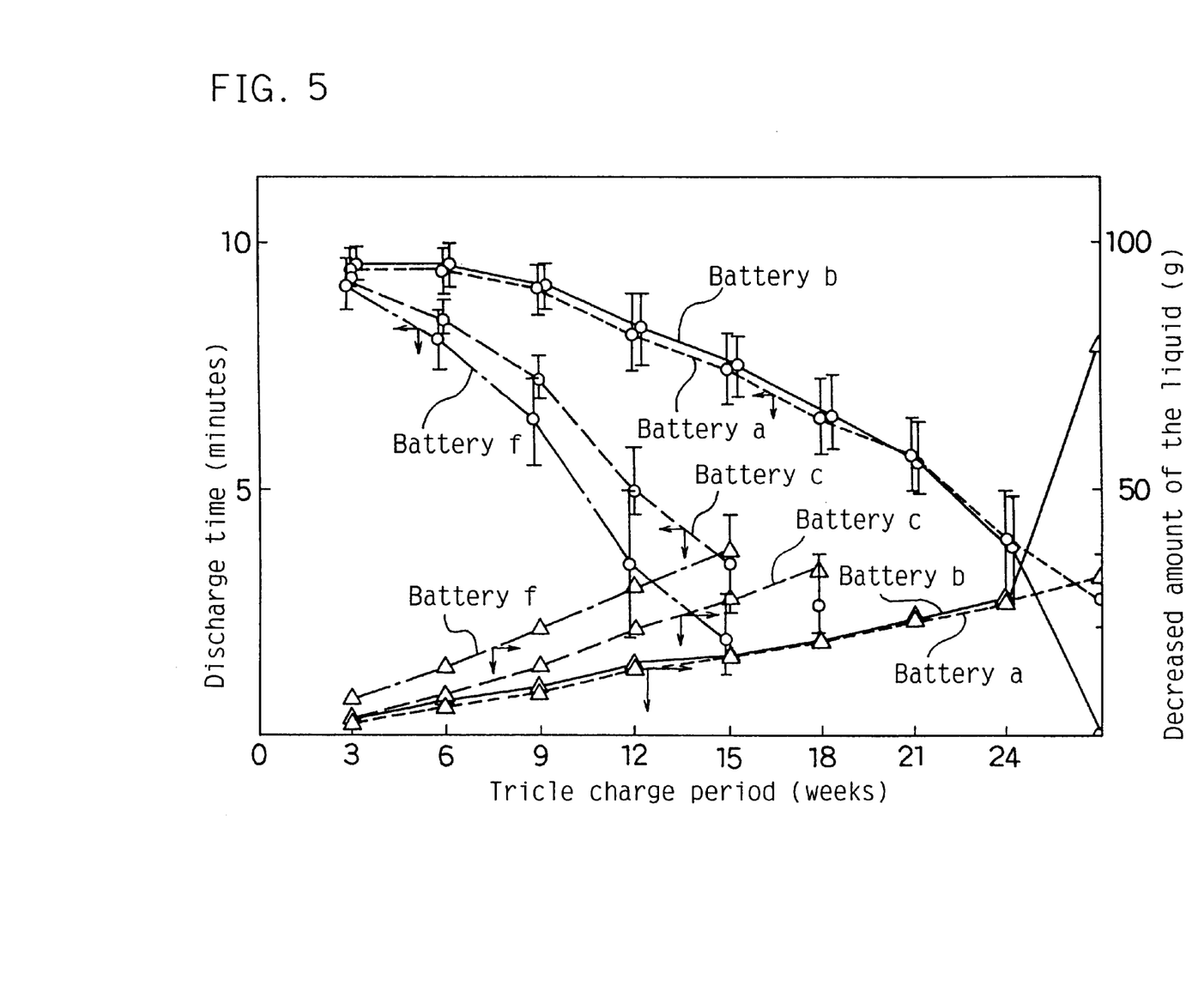
FIG. 5 is a diagram showing the trickle life characteristics and the decreases in the amount of the electrolyte in the sealed lead-acid storage battery in accordance with the embodiment of the present invention and in that of a comparative example.

In addition, since the batteries are frequently in a continuous charging state after the discharge capacity decreases under 50% of the initial discharge capacity in a practical use, the trickle life test is continued for further 3 weeks after the termination of the trickle life. The results thereof are shown in FIG. 5. Each five pieces of the batteries are subjected to the test, and their mean values, maximum values and minimum values are plotted on the diagram in FIG. 5.

From FIG. 5, it is appreciated that Battery "a" of the present invention and Battery "b" of Comparative example have substantially the equivalent trickle life, and the both demonstrate a small decrease in the amount of the electrolyte as compared with Batteries "c" and "f" of Comparative examples whose container contains no talc, and thus they are found to be excellent in the trickle life characteristics. However, Battery "b" of Comparative example, after the termination of the trickle life, demonstrated an abrupt decrease in the discharge capacity with an abrupt decrease in the amount of the electrolyte. In some of Batteries "b", the welded part between the container cover and the top lid is partly damaged, and such abrupt decreases in the discharge capacity and in the electrolyte are believed to be due to the deteriorated gas-tight property of the vent valve on the damaged part.

EXAMPLE 2

Figure 6:
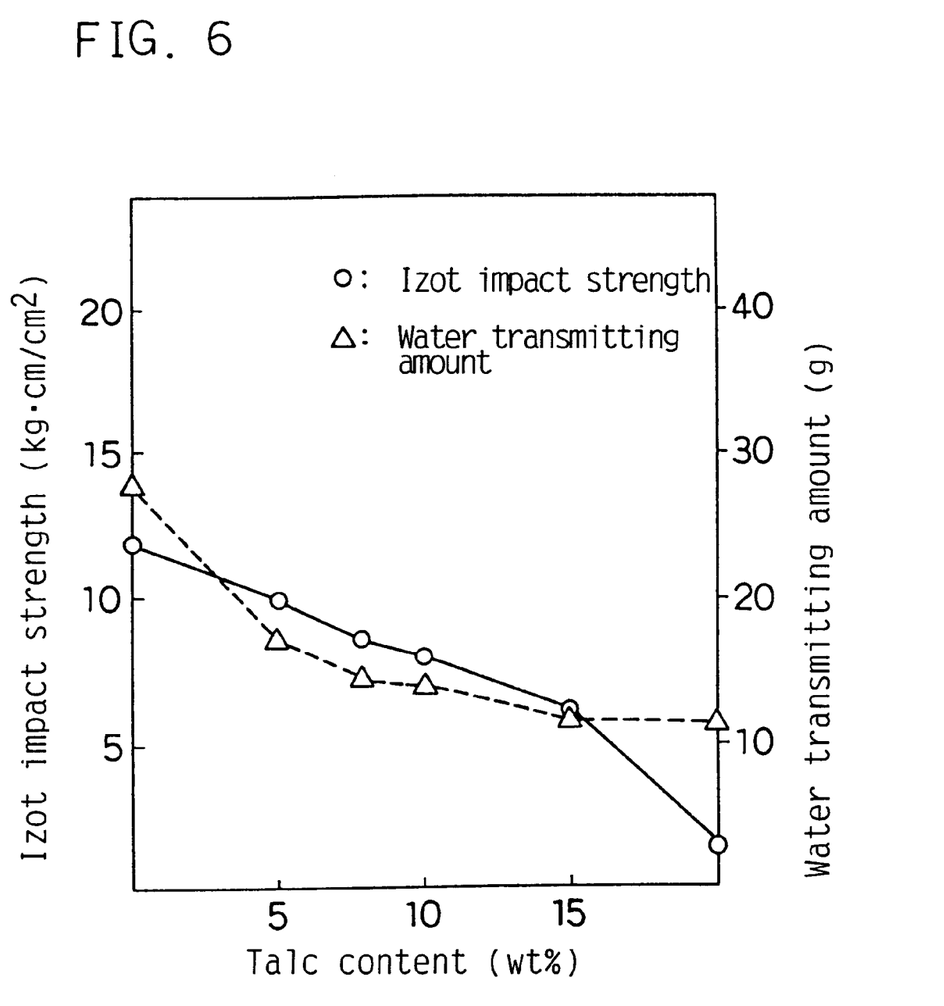
FIG. 6 is a diagram showing the relationship between the talc content of the denatured polyphenylene ether resin and Izod impact strength, and that between the talc content and the water transmitting amount.

By adding talc to the denatured polyphenylene ether resin employed in Example 1 at various proportions, and injection-molding the added resins, test pieces for Izod impact test were produced. The Izod impact strength tests were conducted on these test pieces in compliance with JIS-K7110. The result thereof are shown by the diagram in FIG. 6. As seen from FIG. 6, the impact strength of the resin specimen gradually decreases with the increase in the added proportion of talc, and when it exceeds 15 wt %, the Izod impact strength greatly deteriorates. The reason for this is that the PPE resin becomes unable to maintain its absolute strength by the increase in the added amount of talc. Incidentally, the Izod impact strength of ABS resin containing talc at 10 wt % is 5 kg·cm/cm² which is inferior to that of the PPE resin.

EXAMPLE 3

By using the material of Example 2, a container and a container cover having the same configuration as Example 1 were produced. After bonding the both with the adhesive, 70 cc/cell of distilled water was injected into each of the cells through the inlet port, and the inlet port was sealed so that the distilled water will not leak from the container. Each of the container/container cover assemblies was stood still under an environment of constant temperature at 75° C. and constant humidity of 30±10% for two months and decreases in their weight were measured. The results thereof are also shown by the diagram in FIG. 6. As clearly shown by FIG. 6, when talc is added at 5 wt %, the amount of water transmitting through the container/container cover assembly is extremely decreased, and an effect is recognized in that if the added proportion is further increased, a proportional decrease in the water transmitting amount is expected. This is believed to be due to the fact that since the scaly talc aligns along the flow of the resin during the molding process of the resin, it makes the path of the water transmission complex and suppresses the transmission of the water.

As previously described, according to the present invention, it is possible to provide a sealed lead-acid storage battery having a small escape of water from the inside of the battery and thus a long trickle life. It is also possible to provide a sealed lead-acid storage battery having an improved reliability obtained by a large strength of the ultrasonic wave welded part between the container cover and the top lid covering the part of the container cover where the vent valve is provided.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A sealed lead-acid storage battery comprising a container for accommodating an electrode group, a container cover for closing an open end of said container by being bonded to the open end of said container with a resin adhesive, and a top lid for covering a part of said container cover where a vent valve is provided by being bonded to said container by ultrasonic welding, wherein said container is formed with a denatured polyphenylene ether resin containing a flaky inorganic substance of humidity non-transmitting property, and said container cover and said top lid are formed with acrylonitrile-butadiene-styrene resin containing no flaky inorganic substance of humidity non-transmitting property, and wherein a portion of the top lid is bonded to said container cover thereby forming a gap between said top lid and said container cover for releasing gas.

2. The sealed lead-acid storage battery in accordance with claim 1, wherein said flaky inorganic substance of humidity non-transmitting property is at least one of mica and talc.

3. The sealed lead-acid storage battery in accordance with claim 1, wherein a content of said flaky inorganic substance of humidity non-transmitting property in said container is 5 to 15 wt %.

4. The sealed lead-acid storage battery in accordance with claim 1, wherein the resin of said container is a polymer alloy of a polyphenylene ether resin and a polystyrene resin.

5. The sealed lead-acid storage battery in accordance with claim 4, wherein said polymer alloy comprising 30 to 95 wt % of the polyphenylene ether resin and 70 to 5 wt % of the polystyrene resin.

6. The sealed lead-acid storage battery in accordance with claim 4, wherein said polymer alloy comprising 30 to 80 wt % of the polyphenylene ether resin and 70 to 20 wt % of the polystyrene resin.

7. A sealed lead-acid storage battery according to claim 1, wherein said top lid presses said vent valve.

* * * * *